(12) United States Patent
Palmer

(10) Patent No.: US 10,700,580 B2
(45) Date of Patent: Jun. 30, 2020

(54) ELECTRICAL MACHINE

(71) Applicant: ROLLS-ROYCE plc, London (GB)

(72) Inventor: Chloe Jo Palmer, Derby (GB)

(73) Assignee: ROLLS-ROYCE PLC, London (GB)

(*) Notice: Subject to any disclaimer, the term of this patent is extended or adjusted under 35 U.S.C. 154(b) by 274 days.

(21) Appl. No.: 15/915,229

(22) Filed: Mar. 8, 2018

(65) Prior Publication Data

US 2018/0269760 A1   Sep. 20, 2018

(30) Foreign Application Priority Data

Mar. 17, 2017   (GB) .................................. 1704268.0

(51) Int. Cl.
| | |
|---|---|
| H02K 16/00 | (2006.01) |
| H02K 21/24 | (2006.01) |
| H02K 1/27 | (2006.01) |
| H02K 21/02 | (2006.01) |
| H02K 1/22 | (2006.01) |
| B64D 27/24 | (2006.01) |
| B64C 21/00 | (2006.01) |
| B64C 21/06 | (2006.01) |
| H02P 29/00 | (2016.01) |

(52) U.S. Cl.
CPC ........... *H02K 16/005* (2013.01); *B64C 21/00* (2013.01); *B64C 21/06* (2013.01); *B64D 27/24* (2013.01); *H02K 1/2793* (2013.01); *H02K 21/026* (2013.01); *H02K 21/24* (2013.01); *H02P 29/0016* (2013.01); *B64C 2230/04* (2013.01); *H02K 1/223* (2013.01)

(58) Field of Classification Search
None
See application file for complete search history.

(56) References Cited

U.S. PATENT DOCUMENTS

| | | | |
|---|---|---|---|
| 3,238,433 A | 3/1966 | Brunt | |
| 2011/0291511 A1* | 12/2011 | Crocker | H02K 1/14 310/114 |

(Continued)

FOREIGN PATENT DOCUMENTS

| | | |
|---|---|---|
| JP | H07174067 | 7/1995 |
| WO | 2007095254 | 8/2007 |

OTHER PUBLICATIONS

Xuan Minh Tran, Control design for axial flux permanent magnet synchronous motor which operates above the nominal speed, 2017, ASTESJ, Vol. 2, No. 3, 153-159, pp. 153-159 (Year: 2017).*

(Continued)

*Primary Examiner* — Bickey Dhakal
(74) *Attorney, Agent, or Firm* — Oliff PLC

(57) ABSTRACT

An axial flux electrical machine comprises a first flux generating assembly, a second flux generating assembly, a shaft and a speed controller. The shaft has an axis of rotation. Each of the first flux generating assembly and the second flux generating assembly is rotationally located on the shaft in axial juxtaposition to one another, with the first flux generating assembly being axially separated from the second flux generating assembly by a separation distance. The speed controller is configured to modify a magnetic field generated by either of the first flux generating assembly and the second flux generating assembly so as to control a rotational speed of the electrical machine.

12 Claims, 7 Drawing Sheets

(56) References Cited

U.S. PATENT DOCUMENTS

| | | | |
|---|---|---|---|
| 2014/0252913 A1* | 9/2014 | Fahimi | H02K 19/24 310/216.075 |
| 2016/0181899 A1* | 6/2016 | Mariotto | H02K 1/145 310/46 |
| 2018/0109166 A1* | 4/2018 | Martin | H02K 21/24 |

OTHER PUBLICATIONS

Great Britain Search Report dated Sep. 8, 2017 issued in GB Patent Application No. 1704268.0.

\* cited by examiner

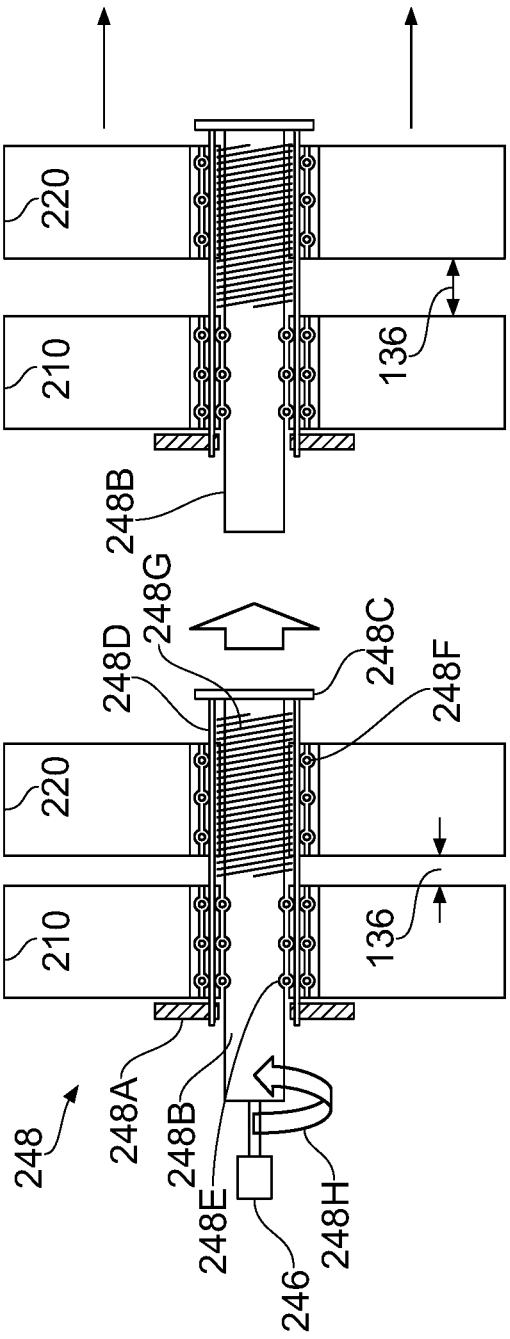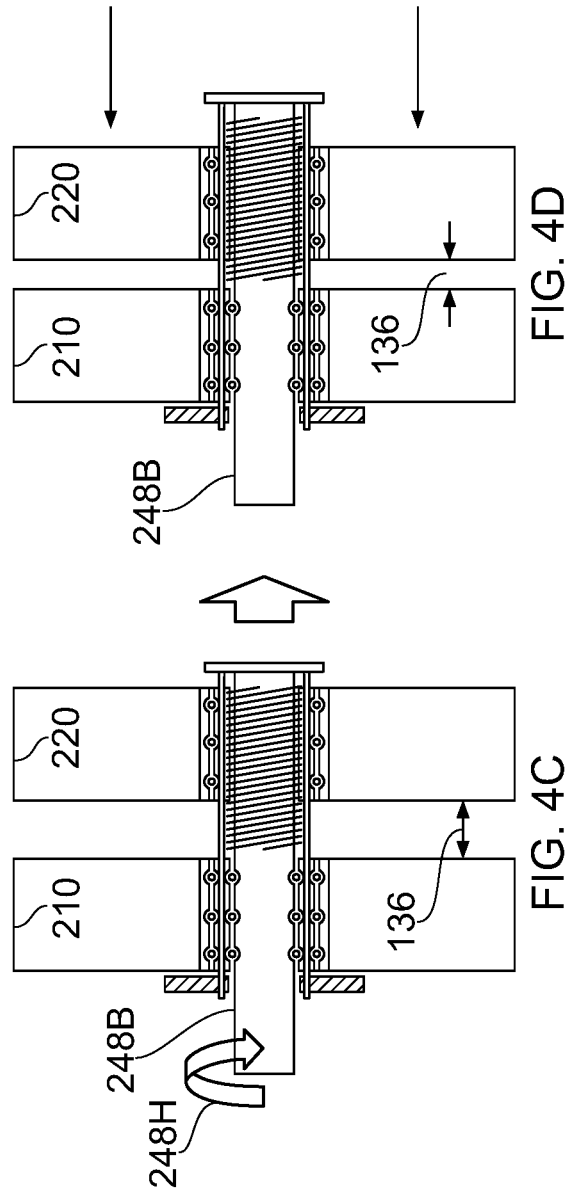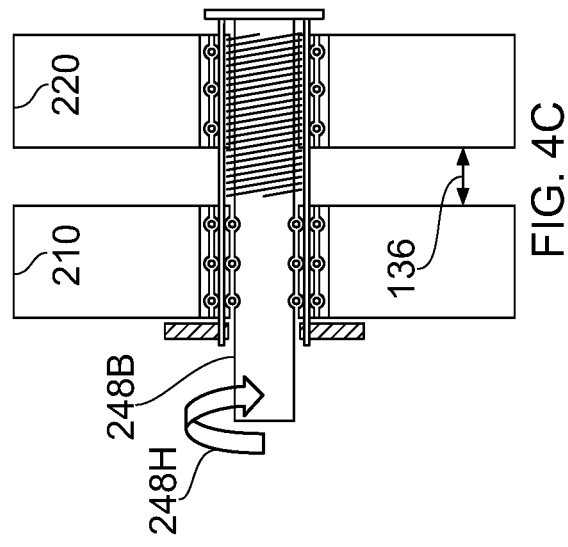

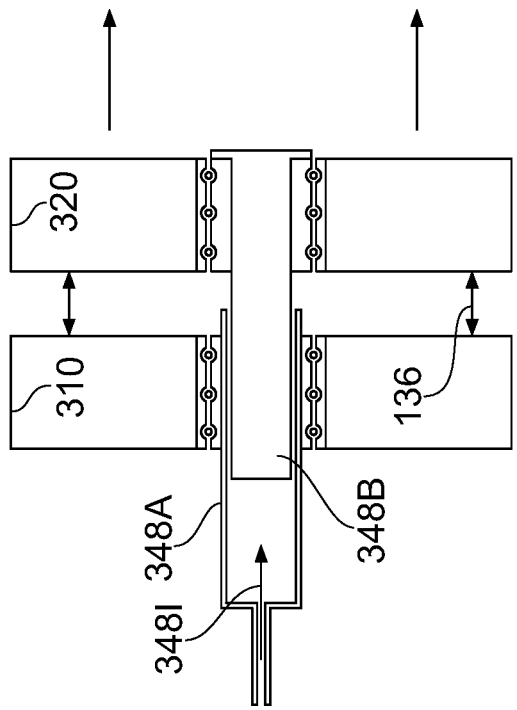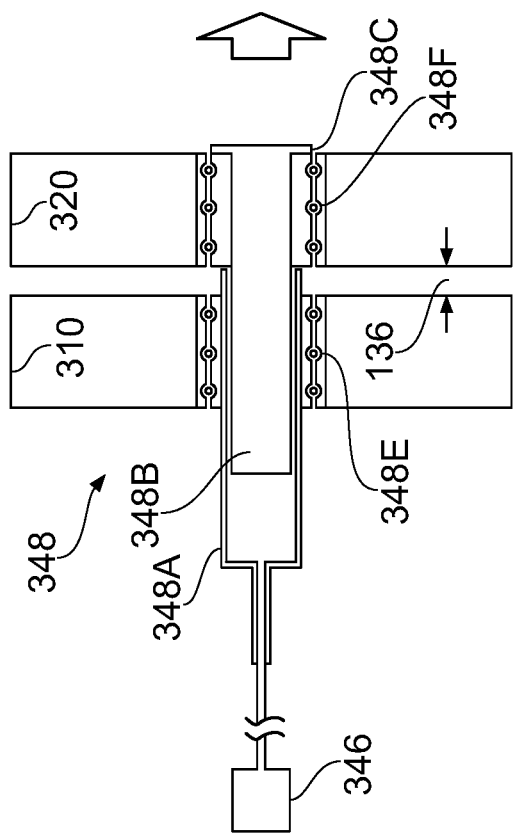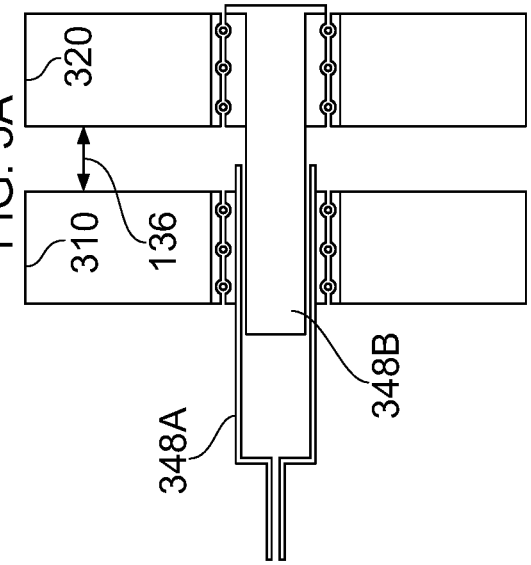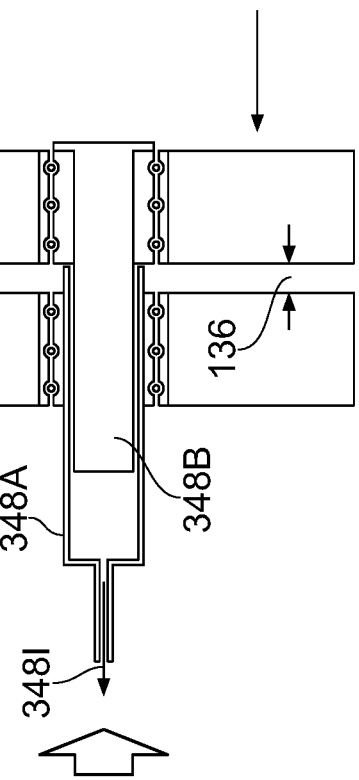

ELECTRICAL MACHINE

CROSS-REFERENCE TO RELATED APPLICATIONS

This application is based upon and claims the benefit of priority from British Patent Application Number 1704268.0 filed 17 Mar. 2017, the entire contents of which are incorporated by reference.

FIELD

The present disclosure relates to an axial flux electrical machine and particularly, but not exclusively, to an axial flux electrical machine for boundary layer ingestion.

BACKGROUND

It is well known that an aircraft body in flight creates a body wake, which is the disturbance in downstream flow resulting from the air flowing over the aircraft body. A proportion of the body wake results from the boundary layer flow over the surface of the aircraft detaching from the surface as the flow leaves the aircraft (i.e. mixing losses).

Reducing the size of, or eliminating the body wake altogether reduces the losses generated in the wake and also in the main jet by reducing the thrust requirements from the main engines.

The concept of Fuselage Boundary Layer Ingestion places the aircraft's engine at or immediately behind the tail of the aircraft so as to ingest the boundary layer flow as it leaves the aircraft's fuselage surface. In this way, the downstream mixing losses in the fuselage wake can be eliminated or significantly reduced.

However, this approach requires the heavy and bulky engines to be mounted at the rear of the aircraft, which makes the construction and operation of the aircraft less practical and less cost effective for a user.

Even the use of a small boundary layer ingesting fan placed at the aft fuselage can provide significant fuel savings in operation of the aircraft. A gas turbine engine is impractical for such supplementary propulsor operation because of the associated weight and space requirements. An electrical propulsion source is preferred due to its high transmission efficiency and reliability. However, a conventional electrical machine in a direct drive arrangement would be heavy, and the additional of a gearbox would further increase complexity and require additional space.

SUMMARY

According to a first aspect of the present disclosure there is provided an axial flux electrical machine comprising:
a first flux generating assembly;
a second flux generating assembly;
a shaft having an axis of rotation; and
a speed controller,
wherein each of the first flux generating assembly and the second flux generating assembly is rotationally located on the shaft in axial juxtaposition to one another, the first flux generating assembly being axially separated from the second flux generating assembly by a separation distance, and the speed controller being configured to modify a magnetic field generated by either of the first flux generating assembly and the second flux generating assembly so as to control a rotational speed of the electrical machine.

The arrangement of two rotatable flux generating assemblies provides the electrical machine with an increased power density over a conventional electrical machine due to the higher relative speed between the two flux generating assemblies. This enables the electrical machine to be lighter and more compact than a conventional electrical machine.

Furthermore, a stationary active part of the machine is not required, therefore weight is reduced.

The use of a speed controller that modifies a magnetic field generated by one of the flux generating assemblies provides for an efficient and simple means of regulating the rotational speed of the electrical machine of the disclosure.

Optionally, the first flux generating assembly comprises one or more winding portions and the second flux generating assembly comprises one or more magnetic portions, the or each winding portion corresponding to a respective one of the or each magnetic portion.

In this configuration the electrical machine has a structure analogous to a conventional axial flux electric motor but with the difference that both of the flux generating assemblies are rotatable. Forming the first flux generating assembly as a winding and the second flux generating assembly as a magnet makes the electrical machine of the disclosure simple and cheap to manufacture and as such more convenient for a user.

Optionally, the first flux generating assembly comprises a plurality of first flux generating portions, and the second flux generating assembly comprises a plurality of second flux generating portions, the plurality of first flux generating portions comprises an alternating circumferential array of magnetic portions and winding portions, and the plurality of second flux generating portions comprises an alternating circumferential array of magnetic portions and winding portions.

Forming the flux generating assemblies as alternating arrays of magnetic and winding portions makes the electrical machine of the disclosure further increases the torque generation capability of the electrical machine over a single element magnet/winding configuration. This increased torque capacity is achieved at the cost of a more complex and hence more expensive configuration.

Optionally, the first flux generating assembly comprises a plurality of first flux generating portions, and the second flux generating assembly comprises a plurality of second flux generating portions, each of the plurality of first flux generating portions being the same and being selected from the group consisting of induction machine portions, permanent magnet portions, synchronous wound field portions and switched reluctance portions, and each of the plurality of second flux generating portions being the same and being selected from the group consisting of induction machine portions, permanent magnet portions, synchronous wound field portions and switched reluctance portions.

By forming the flux generating portions from different fundamental electrical machine technologies, it is possible to tailor the torque/speed characteristics of the electrical machine albeit at the expense of additional structural complexity. However, for high performance drive applications where space and weight are at a premium, this additional complexity may be readily accepted by a user.

Optionally, the speed controller comprises a control plate, the control plate being configured to generate a control magnetic field in opposition to a first magnetic field generated by the first flux generating assembly.

The use of a control plate to generate a magnetic field in opposition to that generated by one of the flux generating assemblies provides for control of the rotational speed of the electrical machine without the need for moving parts. This makes the installation simple and easy for a user to integrate with the flux generating assemblies.

Optionally, the control plate is positioned adjacent to the first flux generating assembly.

This enables the control plate to readily modify the magnetic field generated by the first flux generating assembly without interfering with the interaction between the first and second flux generating assemblies. Consequently, the control plate may be readily optimised for modifying the magnetic field generated by the first flux generating assembly.

Optionally, the control plate is positioned between the first flux generating assembly and the second flux generating assembly.

Positioning the control plate between the first and second flux generating assemblies enables the control plate to more readily modify the magnetic field generated by either the first and/or second flux generating assemblies. However, in this configuration the control plate must be arranged so as not to interfere with the magnetic field interaction between the first and second flux generating assemblies.

Optionally, the first flux generating assembly is axially separated from the second flux generating assembly by a separation distance, and the speed controller comprises a control portion and an actuating portion, the actuating portion being configured to axially move the first flux generating assembly relative to the second flux generating assembly to thereby change the separation distance, in response to a control signal generated by the control portion.

The use of a mechanical control system to vary the separation distance between the first and second flux generating assemblies provides a simple and effective means of varying the magnetic field interaction between the first and second flux generating assemblies.

Effective speed control of the electrical machine can be effected by very small changes in the separation between the first and second flux generating assemblies. For example, sub-millimetre movement of one of the flux generating assemblies will be capable of rotational speed control over the full operating range of the electrical machine.

A mechanical system for changing the separation between the flux generating assemblies can be both simple and lightweight, and hence desirable for a user.

Optionally, the actuating portion comprises an actuator selected from the group consisting of hydraulic actuators, electrical actuators, screw actuators, lever actuators and piezo-electric actuators.

In one arrangement, a hydraulic actuation system is used to move the first flux generating assembly relative to the second flux generating assembly.

According to a second aspect of the present disclosure there is provided a propulsion system comprising:
a machine body having an upstream end and an opposite downstream end;
an axial flux electrical machine as claimed in any one of claims 1 to 9;
a plurality of first fan blades arranged in a circumferential array around an outer circumference of the first flux generating assembly; and
a plurality of second fan blades arranged in a circumferential array around an outer circumference of the second flux generating assembly,
wherein the axial flux electrical machine is positioned at the downstream end of the machine body such that a fluid flow passing over the machine body, from the upstream end to the downstream end, is successively drawn through the first fan blade array and the second fan blade array to thereby entrain the flow passing over the surface of the machine body and thereby to accelerate the flow.

The high power density and low space requirements for the electrical machine of the disclosure makes it ideal for use as part of a boundary layer propulsion system. The electrical machine may be mounted in the tail portion of an aircraft with a bladed array extending radially outwardly from each of the flux generating assemblies.

In a boundary layer propulsion system, the fan blade array is primarily powered by the free stream flow over the surface of the machine body. The consequent rotation of the fan array causes an entrainment of the boundary layer flow passing over the surface of the machine body. The entrained boundary layer flow is accelerated and drawn over the surface of the machine body.

The contra-rotation of the flux generating assemblies makes an ideal power source for a pair of contra-rotating propulsion fans.

Optionally, the machine body is selected from the group consisting of aircraft, marine surface vessels, and marine sub-surface vessels.

The application of a pair of contra-rotating fans to the tail end of an aircraft fuselage provides a large degree of fuselage boundary layer ingestion which, in turn, decreases the associated downstream mixing losses and increases the efficiency of the aircraft.

According to a third aspect of the present disclosure there is provided a method of controlling a rotational speed of an axial flux electrical machine, the method comprising the steps of:
providing a first rotatable flux generating assembly and a second rotatable flux generating assembly;
positioning the first rotatable flux generating assembly and the second rotatable flux generating assembly in axial juxtaposition on a shaft;
providing excitation energy to one of the first rotatable flux generating assembly and the second rotatable flux generating assembly; and
using a speed controller to vary a magnetic field generated by one of the first rotatable flux generating assembly and the second rotatable flux generating assembly, thereby controlling the rotational speed of the electrical machine.

Generating a magnetic field in opposition to that generated by the first flux generating assembly provides a simple technique for controlling the rotational speed of the electrical machine.

Optionally, the step of using a speed controller to vary a magnetic field generated by one of the first rotatable flux generating assembly and the second rotatable flux generating assembly comprises the steps of:
positioning a control plate adjacent to the first rotatable flux generating assembly;
generating a control magnetic field from the control plate, the control magnetic field being in opposition to a first magnetic field generated by the first rotatable flux generating assembly; and
varying the control magnetic field in response to a user input, thereby controlling the rotational speed of the electrical machine.

The use of a control plate to generate a magnetic field in opposition to that generated by one of the flux generating assemblies provides for control of the rotational speed of the electrical machine without the need for moving parts. This makes the installation simple and easy for a user to integrate with the flux generating assemblies.

This enables the control plate to readily modify the magnetic field generated by the first flux generating assembly without interfering with the interaction between the first and second flux generating assemblies. Consequently, the control plate may be readily optimised for modifying the magnetic field generated by the first flux generating assembly.

Optionally, the step of positioning a control plate adjacent to the first rotatable flux generating assembly comprises the step of:

positioning a control plate between the first rotatable flux generating assembly and the second rotatable flux generating assembly.

Positioning the control plate between the first and second flux generating assemblies enables the control plate to more readily modify the magnetic field generated by either the first and/or second flux generating assemblies. However, in this configuration the control plate must be arranged so as not to interfere with the magnetic field interaction between the first and second flux generating assemblies.

Optionally, the step of using a speed controller to vary a magnetic field generated by one of the first rotatable flux generating assembly and the second rotatable flux generating assembly comprises the steps of:

positioning a control plate between the first rotatable flux generating assembly and the second rotatable flux generating assembly;

generating a control magnetic field from the control plate, the control magnetic field being in opposition to a first magnetic field generated by the first rotatable flux generating assembly and/or a second magnetic field generated by the second rotatable flux generating assembly; and varying the control magnetic field in response to a user input, thereby controlling the rotational speed of the electrical machine.

Optionally, the first rotatable flux generating assembly is axially separated from the second rotatable flux generating assembly by a separation distance, and the step of using a speed controller to vary a magnetic field generated by one of the first rotatable flux generating assembly and the second rotatable flux generating assembly, comprises the steps of:

providing a control portion that generates a control signal in response to a user input; and providing an actuating portion that is configured to axially move the first rotatable flux generating assembly relative to the second rotatable flux generating assembly to thereby change the separation distance, in response to the control signal, the change in separation distance resulting in a change to a magnetic field generated by one of the first rotatable flux generating assembly and the second rotatable flux generating assembly, thereby controlling the rotational speed of the electrical machine.

The use of a mechanical control system to vary the separation distance between the first and second flux generating assemblies provides a simple and effective means of varying the magnetic field interaction between the first and second flux generating assemblies.

Effective speed control of the electrical machine can be effected by very small changes in the separation between the first and second flux generating assemblies. For example, sub-millimetre movement of one of the flux generating assemblies will be capable of rotational speed control over the full operating range of the electrical machine.

A mechanical system for changing the separation between the flux generating assemblies can be both simple and lightweight, and hence desirable for a user.

According to a fourth aspect of the present disclosure there is provided a computer program that, when read by a computer, causes performance of the method according to the third aspect.

According to a fifth aspect of the present disclosure there is provided a non-transitory computer readable storage medium comprising computer readable instructions that, when read by a computer, cause performance of the method according to the third aspect.

According to a sixth aspect of the present disclosure there is provided a signal comprising computer readable instructions that, when read by a computer, cause performance of the method according to the third aspect.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which:

FIGS. 4A to 4D show schematic views of a mechanical actuator providing the relative axial movement between the first and second flux generating assemblies;

FIGS. 5A to 5D show schematic views of a hydraulic actuator providing the relative axial movement between the first and second flux generating assemblies;

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
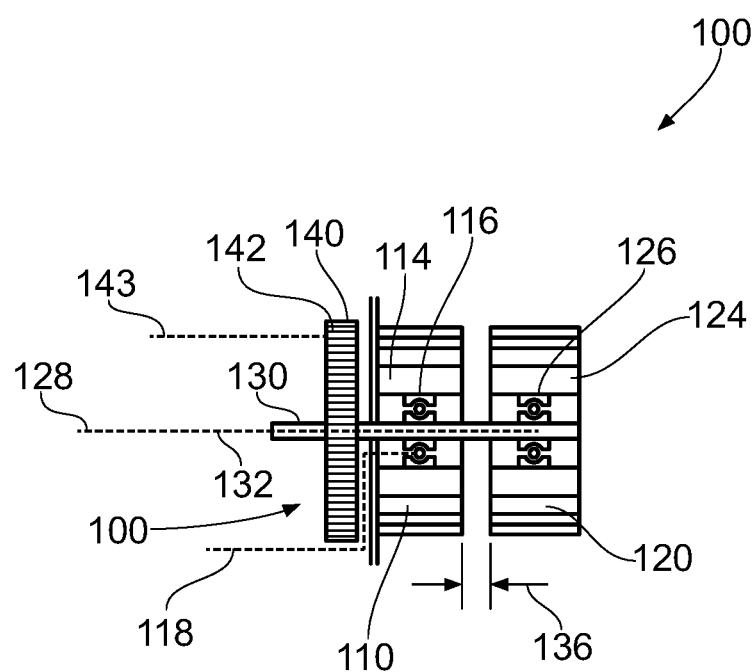
FIG. 1 shows a schematic part-sectional view of an axial flux electrical machine according to a first aspect of the disclosure.

Referring to FIGS. 1 to 3, 4A to 4D, and 5A to 5D, an axial flow electrical machine according to a first embodiment of the disclosure is designated generally by the reference numeral 100, and a boundary layer propulsion system according to a second embodiment of the disclosure is designated generally by the reference numeral 200.

In the following description, the boundary layer propulsion system 200 is described in the context of an aircraft propulsor. However, the boundary layer propulsion system 200 may equally be applied to a marine vessel propulsor, an underwater vessel or another arrangement in which a body is to be propelled through a fluid.

The axial flow electrical machine 100 comprises a first flux generating assembly 110, a second flux generating assembly 120, a shaft 130, and a speed controller 140.

The first flux generating assembly 110 and the second flux generating assembly 120 are mounted co-axially in axial sequence on the shaft 130. The first flux generating assembly 110 and the second flux generating assembly 120 are in axial juxtaposition to one another. The first flux generating assembly 110 is rotationally mounted on a bearing assembly 116. The second flux generating assembly 120 is rotationally mounted on a bearing assembly 126.

The speed controller 140 is arranged to modify a magnetic field that is generated by either of the first flux generating assembly 110 or the second flux generating assembly 120 to thereby control a rotational speed of the electrical machine 100.

In the context of the present disclosure, the axial flux electrical machine 100 comprises two free rotating elements, namely the first and second flux generating assemblies 110,120. Consequently, in operation the first and second flux generating assemblies 110,120 will rotate in opposite directions to one another. In other words, the first and second flux generating assemblies 110,120 will contra-rotate.

In the present arrangement the first flux generating assembly 110 comprises a plurality of windings 114 in the form of a repeating circumferential array of first coils 114A, second coils 114B, and third coils 114C. The second flux generating assembly 120 is formed as an induction cage 124A.

Figure 3:
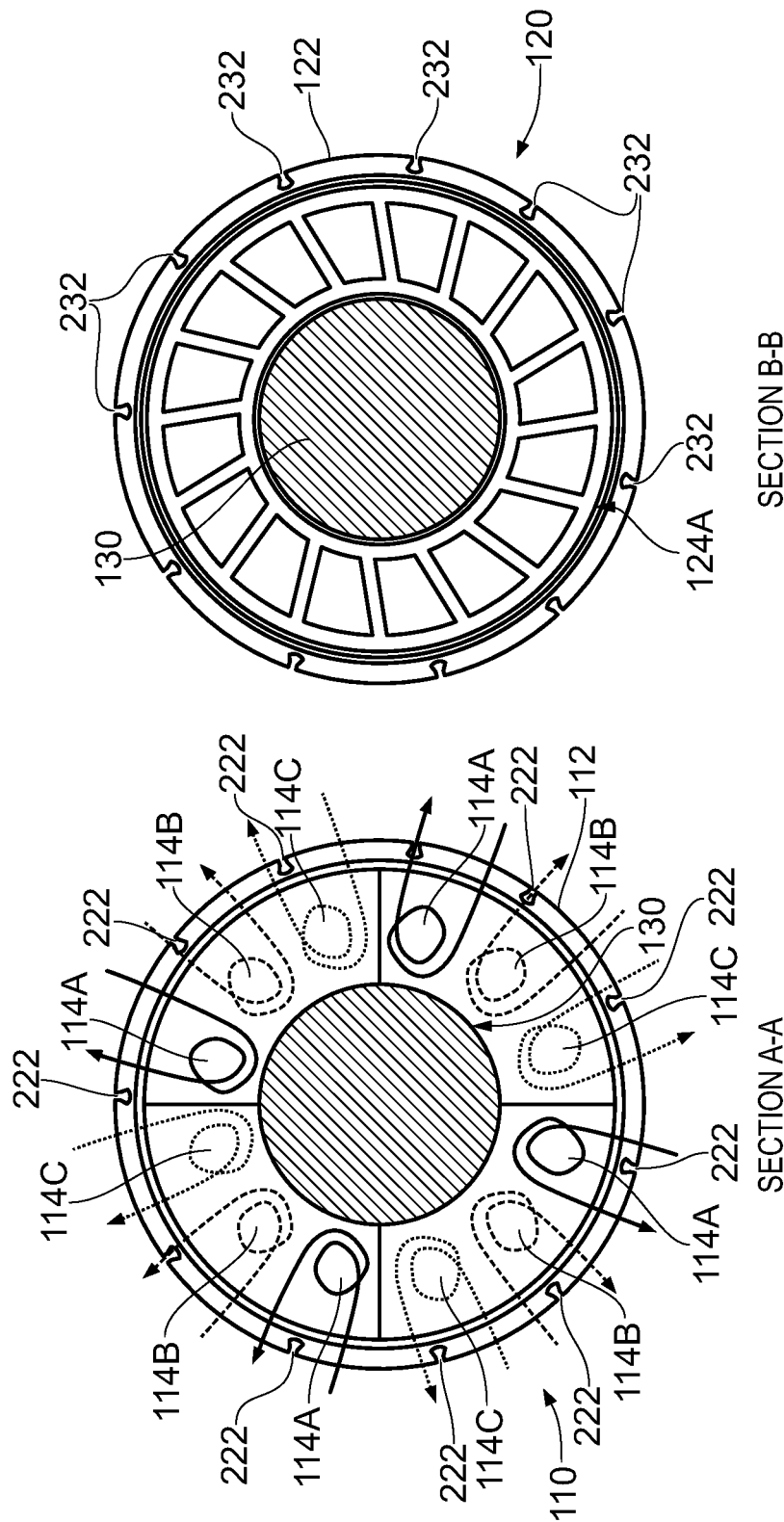
FIG. 3 shows a schematic cross-sectional view of a an axial flux electrical machine according to a first aspect of the disclosure.

This structure of the first and second flux generating assemblies 110,120 is illustrated in FIG. 3. The left hand view of FIG. 3 (Section A-A) is a sectional view looking forwards (or upstream) onto the first flux generating assembly 110. Likewise, the right hand view of FIG. 3 (Section B-B) is a sectional view looking rearwards (or downstream) onto the second flux generating assembly 120.

In the arrangement of FIG. 1, the speed controller 140 is a control plate 142 that is configured to generate a magnetic field that can combine additively or subtractively with the magnetic field that is generated by the first flux generating assembly 110 to modify the rotational speed of the electrical machine 100.

In an alternative arrangement (not shown) the control plate 142 may be positioned between the first flux generating assembly 110 and the second flux generating assembly 120. In this alternative arrangement, the control plate 142 may be configured to modify the magnetic field that is generated by either or both of the first flux generating assembly 110 and the second flux generating assembly 120.

A further alternative technique for modifying the magnetic field that is generated by either of the first flux generating assembly 110 or the second flux generating assembly 120 is to vary the axial separation distance 136 between the first flux generating assembly 110 and the second flux generating assembly 120.

FIGS. 4A to 4D illustrate a first scheme for varying the separation distance 136 between the first and second flux generating assemblies 210,220. A control portion 246 is connected to an actuation portion 248. The control portion 246 generates a control signal dependent upon the desired change in rotational speed of the axial flux electrical machine 110. This control signal passes to the actuating portion 248 to cause a change in the separation distance 136, and hence a change in the rotational speed of the axial flux electrical machine 100.

As shown in FIG. 4A, the first flux generating assembly 210 is positioned on a static bearing unit 248E that is fixed to a static anchor 248A. This allows the first flux generating assembly 210 to rotate but constrains it axially.

The second flux generating assembly 220 is located by a rotor positioning screw 248B that is concentric with the static bearing unit 248E. The second flux generating assembly 220 is positioned on a sliding bearing unit 248F, which enables the second flux generating assembly 220 to rotate about the same axis as the first flux generating assembly 210.

In addition, the first flux generating assembly 210 and the second flux generating assembly 220 are located on guide elements 248D. The guide elements 248D ensure that the relative movement of the first and second flux generating assemblies 210,220 is precisely co-axial.

Rotation of the rotor positioning screw 248B in a first direction as shown in FIG. 4A results in the separation distance 136 being increased as shown in FIG. 4B. This increase in the separation distance 136 will decrease the magnetic field interaction between the first and second flux generating assemblies 210,220 and hence will decrease the rotational speed of both the first and second flux generating assembles 210,220.

Conversely, rotation of the rotor positioning screw 248B in an opposite second direction as shown in FIG. 4C results in the separation distance 136 being reduced as shown in FIG. 4D. This reduction in the separation distance 136 will increase the magnetic field interaction between the first and second flux generating assemblies 210,220 and hence will increase the rotational speed of both the first and second flux generating assembles 210,220.

An alternative second scheme for varying the separation distance 136 between the first and second flux generating assemblies 110,120 is illustrated in FIGS. 5A to 5D. As outlined above, a control portion 346 is connected to an actuating portion 348 to cause a change in the separation distance 136.

As shown in FIG. 5A, the first lux generating assembly 310 is mounted on a static bearing unit 348E. In this arrangement, the static bearing unit is axially fixed to a hydraulic ram cylinder 348A. In this way, the first flux generating assembly 310 is free to rotate but is axially constrained.

The second flux generating assembly 320 is attached to a ram cylinder 348B and is axially secured by an end flange 348C. The second flux generating assembly 320 is positioned on a sliding bearing unit 348F. In this way, as the ram cylinder 348B translates axially, the second flux generating assembly 320 is able to freely rotate co-axially with the first flux generating assembly 310.

FIGS. 4A to 4D and FIGS. 5A to 5D illustrate two techniques for varying the separation distance 136 between the first and second flux generating assemblies 110,120. The skilled person will appreciate that any further alternative arrangement for varying this separation distance 136 may be used.

Figure 2:
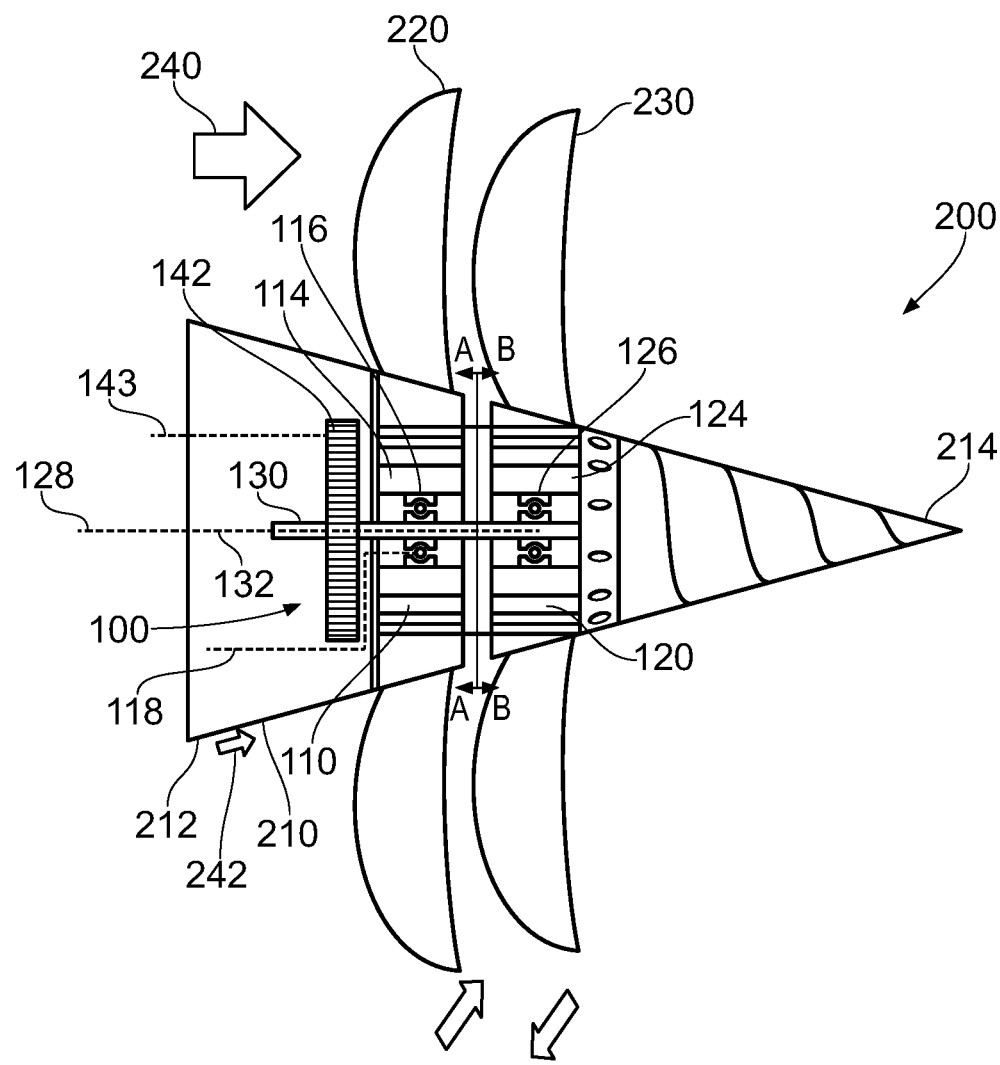
FIG. 2 shows a schematic part-sectional view of a boundary layer propulsion system according to a second aspect of the disclosure.

Referring to FIGS. 2 and 3, a boundary layer propulsion system according to a second embodiment of the disclosure is designated generally by the reference numeral 200. Features of the boundary layer propulsion system 200 which correspond to those of the axial flow electrical machine 100 have been given corresponding reference numerals for ease of reference.

The boundary layer propulsion system 200 has an axial flux electrical machine 100 that is positioned in a tail section of a fuselage 210 of an aircraft (not shown completely). The fuselage 210 has an upstream end 212 and an opposite downstream end 214. The axial flus electrical machine 100 is positioned at the downstream end 214 of the fuselage 210.

In this arrangement, the first flux generating assembly 110 is positioned upstream of the second flux generating assembly 120, with the speed controller 140, in the form of a control plate 142, being positioned upstream of the first flux generating assembly 110.

As outlined above, in an alternative configuration the speed controller 140 may take the form of a mechanical system (illustrated in FIGS. 4A to 4B) or a hydraulic system (illustrated in FIGS. 5A to 5B).

The first flux generating assembly 110 has an outer circumference 112. Arranged around this outer circumference 112 in a circumferential array is a plurality of first fan blades 220. Each first fan blade 220 is secured to the outer circumference 112 by means of a first blade attachment point 222.

Likewise, the second flux generating assembly 120 has an outer circumference 122. Arranged around this outer circumference 122 in a circumferential array is a plurality of second fan blades 230. Each second fan blade 230 is secured to the outer circumference 122 by means of a first blade attachment point 232.

In the present arrangement the first and second blade attachment points 222,232 are formed with a pyriform cross-sectional profile. In an alternative arrangement, the first and second blade attachment points 222,232 may be formed with a 'fir tree' cross-sectional profile or another cross-sectional profile suitable for fan blade retention.

In use the contra-rotation of the first and second fan blades 220,230 draws an air flow 240 therethrough, whilst also entraining a boundary layer flow 242 passing over the surface 216 of the fuselage 210.

Figure 6:
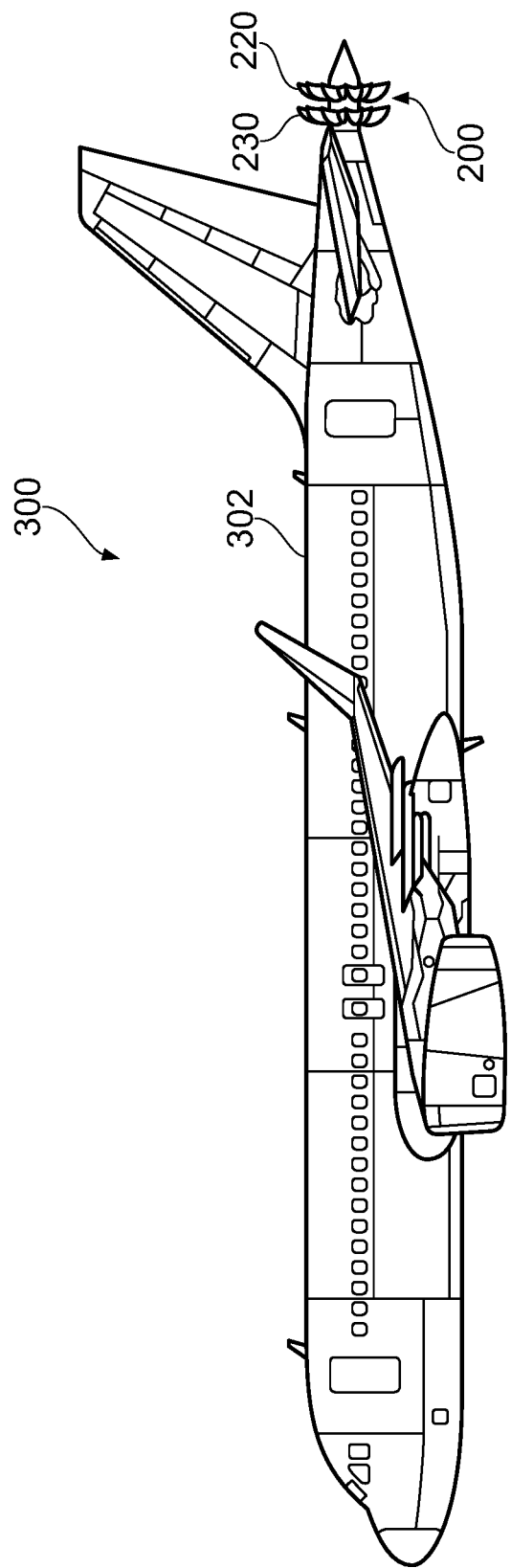
FIG. 6 shows an elevational view of an aircraft comprising a boundary layer propulsion system according to the second aspect of the disclosure.

FIG. 6 shows an aircraft 302 comprising a boundary layer propulsion system 200 that has been mounted at the tail of the fuselage of the aircraft. The boundary layer propulsion system 200 comprises a downstream array of first fan blades 220 axially adjacent to an upstream array of second fan blades 230. In the arrangement of FIG. 6, the first fan blades 220 are the same as the second fan blades 230.

Figure 7:
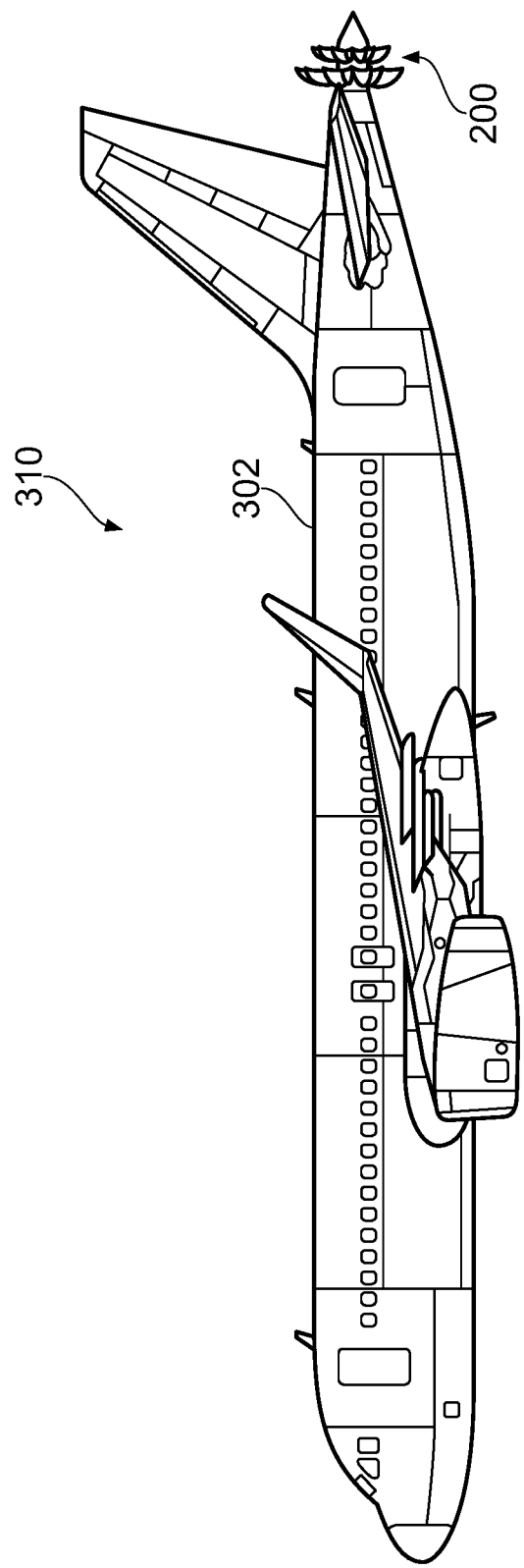
FIG. 7 shows an alternative arrangement of FIG. 6.

FIG. 7 shows an alternative arrangement of an aircraft 310 comprising a tail-mounted boundary propulsion system 200. In the arrangement of FIG. 7 the first fan blades 220 have a larger diameter than the second fan blades 230.

In still further arrangements, the arrays of first fan blades 220 and second fan blades 230 may have alternative geometrical arrangements.

Various example embodiments of the invention are described herein. Reference is made to these examples in a non-limiting sense. They are provided to illustrate more broadly applicable aspects of the invention. Various changes may be made to the invention described and equivalents may be substituted without departing from the scope of the invention. In addition, many modifications may be made to adapt a particular situation, material, composition of matter, process, process act(s) or step(s) to the objective(s), or scope of the present invention. Further, it will be appreciated by those with skill in the art that each of the individual variations described and illustrated herein has discrete components and features which may be readily separated from or combined with the features of any of the other several embodiments without departing from the scope of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Except where mutually exclusive, any of the features may be employed separately or in combination with any other features and the disclosure extends to and includes all combinations and sub-combinations of one or more features described herein.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person of skill in the art are included within the scope of the disclosure as defined by the accompanying claims.

The invention claimed is:

1. An axial flux electrical machine comprising:
a first flux generating assembly;
a second flux generating assembly;
a shaft having an axis of rotation; and
a speed controller,
wherein each of the first flux generating assembly and the second flux generating assembly is rotationally located on the shaft in axial juxtaposition to one another, the first flux generating assembly being axially separated from the second flux generating assembly by a separation distance, and the speed controller being configured to modify a magnetic field generated by either of the first flux generating assembly and the second flux generating assembly so as to control a rotational speed of the electrical machine; and
wherein the speed controller comprises a control plate, the control plate being configured to generate a control magnetic field in opposition to a first magnetic field generated by the first flux generating assembly.

2. The axial flux electrical machine as claimed in claim 1, wherein the first flux generating assembly comprises one or more winding portions and the second flux generating assembly comprises one or more magnetic portions, the one or more winding portions corresponding to a respective one of the one or more magnetic portions.

3. The axial flux electrical machine as claimed in claim 1, wherein the first flux generating assembly comprises a plurality of first flux generating portions, and the second flux generating assembly comprises a plurality of second flux generating portions, the plurality of first flux generating portions comprises an alternating circumferential array of magnetic portions and winding portions, and the plurality of second flux generating portions comprises an alternating circumferential array of magnetic portions and winding portions.

4. The axial flux electrical machine as claimed in claim 1, wherein the first flux generating assembly comprises a plurality of first flux generating portions, and the second flux generating assembly comprises a plurality of second flux generating portions, each of the plurality of first flux generating portions being the same and being selected from the group consisting of induction machine portions, permanent magnet portions, synchronous wound field portions and switched reluctance portions, and each of the plurality of second flux generating portions being the same and being selected from the group consisting of induction machine portions, permanent magnet portions, synchronous wound field portions and switched reluctance portions.

5. The axial flux electrical machine as claimed in claim 1, wherein the control plate is positioned adjacent to the first flux generating assembly.

6. The axial flux electrical machine as claimed in claim 1, wherein the control plate is positioned between the first flux generating assembly and the second flux generating assembly.

7. An axial flux electrical machine comprising:
a first flux generating assembly;
a second flux generating assembly;
a shaft having an axis of rotation; and
a speed controller,
wherein each of the first flux generating assembly and the second flux generating assembly is rotationally located on the shaft in axial juxtaposition to one another, the first flux generating assembly being axially separated from the second flux generating assembly by a separation distance, and the speed controller being configured to modify a magnetic field generated by either of the first flux generating assembly and the second flux generating assembly so as to control a rotational speed of the electrical machine, wherein
the speed controller comprises a control portion and an actuating portion, the actuating portion being configured to axially move the first flux generating assembly relative to the second flux generating assembly to thereby change the separation distance, in response to a control signal generated by the control portion.

8. A propulsion system comprising:
a machine body having an upstream end and an opposite downstream end;
an axial flux electrical machine comprising:
a first flux generating assembly;
a second flux generating assembly;
a shaft having an axis of rotation; and
a speed controller,
wherein each of the first flux generating assembly and the second flux generating assembly is rotationally located on the shaft in axial juxtaposition to one another, the first flux generating assembly being axially separated from the second flux generating assembly by a separation distance, and the speed controller being configured to modify a magnetic field generated by either of the first flux generating assembly and the second flux generating assembly so as to control a rotational speed of the electrical machine;
a plurality of first fan blades arranged in a circumferential array around an outer circumference of the first flux generating assembly; and
a plurality of second fan blades arranged in a circumferential array around an outer circumference of the second flux generating assembly, wherein the axial flux electrical machine is positioned at the downstream end of the machine body such that a fluid flow passing over the machine body, from the upstream end to the downstream end, is successively drawn through the first fan blade array and the second fan blade array to thereby entrain the flow passing over the surface of the machine body and thereby to accelerate the flow.

9. The propulsion system as claimed in claim 8, wherein the machine body is an aircraft.

10. A method of controlling a rotational speed of an axial flux electrical machine, the method comprising the steps of:
providing a first rotatable flux generating assembly and a second rotatable flux generating assembly;
positioning the first rotatable flux generating assembly and the second rotatable flux generating assembly in axial juxtaposition on a shaft;
providing excitation energy to one of the first rotatable flux generating assembly and the second rotatable flux generating assembly; and
using a speed controller to vary a magnetic field generated by one of the first flux rotatable generating assembly and the second rotatable flux generating assembly, thereby controlling the rotational speed of the electrical machine, by:
positioning a control plate adjacent to the first flux rotatable generating assembly;
generating a control magnetic field from the control plate, the control magnetic field being in opposition to a first magnetic field generated by the first rotatable flux generating assembly; and
varying the control magnetic field in response to a user input, thereby controlling the rotational speed of the electrical machine.

11. The method as claimed in claim 10, wherein the step of positioning the control plate adjacent to the first rotatable flux generating assembly comprises the step of:
positioning the control plate between the first rotatable flux generating assembly and the second rotatable flux generating assembly.

12. A method of controlling a rotational speed of an axial flux electrical machine, the method comprising the steps of:
providing a first rotatable flux generating assembly and a second rotatable flux generating assembly;
positioning the first rotatable flux generating assembly and the second rotatable flux generating assembly in axial juxtaposition on a shaft;
providing excitation energy to one of the first rotatable flux generating assembly and the second rotatable flux generating assembly; and
using a speed controller to vary a magnetic field generated by one of the first flux rotatable generating assembly and the second rotatable flux generating assembly, thereby controlling the rotational speed of the electrical machine;
wherein the first rotatable flux generating assembly is axially separated from the second rotatable flux generating assembly by a separation distance, and the step of using the speed controller to vary a magnetic field generated by one of the first rotatable flux generating assembly and the second rotatable flux generating assembly, comprises the steps of:
providing a control portion that generates a control signal in response to a user input; and
providing an actuating portion that is configured to axially move the first rotatable flux generating assembly relative to the second rotatable flux generating assembly to thereby change the separation distance, in response to the control signal, the change in separation distance resulting in a change to a magnetic field generated by one of the first rotatable flux generating assembly and the second rotatable flux generating assembly, thereby controlling the rotational speed of the electrical machine.

* * * * *